Nov. 19, 1957   M. J. DOLECKI ET AL   2,813,984

GENERATING SYSTEM

Filed March 12, 1956

INVENTORS:
MATTHEW J. DOLECKI
EDMUND M. WARNER

BY Bernard A. Chioma

ATTORNEY

Nov. 19, 1957

M. J. DOLECKI ET AL 2,813,984

GENERATING SYSTEM

Filed March 12, 1956

INVENTORS:
MATTHEW J. DOLECKI
EDMUND M. WARNER

BY Bernard A. Chiama

ATTORNEY

United States Patent Office 2,813,984
Patented Nov. 19, 1957

2,813,984

GENERATING SYSTEM

Matthew J. Dolecki, Oil City, and Edmund M. Warner, Franklin, Pa., assignors to Joy Manufacturing Company, Pittsburgh, Pa., a corporation of Pennsylvania Application March 12, 1956, Serial No. 570,896

6 Claims. (Cl. 290—10)

This invention relates to electrical generating systems and, more particularly, to a generating system for use in a mine and employing an internal combustion engine for driving a generator which in turn is utilized for charging a storage battery and/or directly motivating the vehicle.

In recent years, with the advent of automatic mining equipment, conveyors, transporting devices, and the quest for more production with less manpower, the need for fast propulsion mechanism has been seriously hampered because of the restriction placed upon the amount of exhaust fumes in a mine. This problem has been alleviated somewhat by using electrically propelled vehicles or other equipment which are fed through cables from a stationary electrical source. However, there are numerous disadvantages to this system most important of which resides in the necessity of rather extended lengths of cable and the lack of mobility that these lengths may impose upon the vehicles, not to speak of the relatively high cost and maintenance of the cables.

Another and more practical system of powering vehicles is the use of a large storage battery for energizing motors mechanically connected to the wheels of a vehicle. A generator may be utilized to periodically charge the battery and also to drive the motor when the load is too great for the battery, and the use of a relatively small properly governed diesel engine to turn the generator has effectively solved the problem of mobility in a mine vehicle. However, the problem of exhaust fumes is still present and has led many designers to incorporate various types of "scrubbers" and filtering systems for cleaning exhaust fumes. At best, these "scrubbers" are suitable for normal operation of the diesel engine but have been ineffective to thoroughly prevent the escape of dangerous exhaust fumes in the event the engine is overloaded from relatively instantaneous and excessive generator demands, which event occurs quite frequently during use of mine vehicles.

In devices of this general character, it has been customary to provide the internal combustion engine with governor control thereby to insure a fairly constant R. P. M. output of the engine which in turn will insure steady output of the generator. Present day governors control the amount of air-fuel mixture into the fuel distributing mechanism of the engine in accordance with the R. P. M. output of the engine. A load, which is over the generator rating or the horsepower rating of the engine, will tend to decrease the R. P. M. output and the governor will respond by allowing more mixture to be fed to the engine. However, because of various mechanical linkages, mass inertia, etc., an appreciable time delay is experienced before the engine will be able to respond to the increased supply of mixture. Once the governor commences to respond to the increased load, there is a tendency for the same to overshoot resulting in the admission of excessive mixture to the engine and flooding of the combustion chambers thereby causing excessive exhaust fumes and smoke. Since the response time of the present day governor is appreciably high, sudden decreases in the load will result in too much fuel being injected into the combustion chamber for the decreased load and still more exhaust fumes will be generated therein.

As yet, there has been no effective way to curb the periodic outbursts of exhaust fumes from these engines, at least to an extent permissible by the mining codes of the various states. Therefore it is the principal object of the present invention to insure complete elimination of excessive exhaust fumes from engine-powered generators in order to conform to present day permissible exhaust gas requirements in mines.

The present day engine generating systems are also arranged to start the engine by utilizing a switching arrangement whereby the generator serves as a motor for rotating the engine crankshaft. In other instances, separate starting motors and batteries are used to effect starting of the engine. In the former, the generators are usually of the compound accumulative type wherein, during the starting cycle, the series circuit is usually reversed to aid the producing flux of the shunt winding whereby the combination produces the starting torque. However, these systems require elaborate and complicated switching arrangements for reversing the series winding only during the starting cycle of the generator when used as a motor. Unless either of these systems is used, the starting torque produced by the motorized generator is quite low and several turns must be made before the engine will start. This results in excessive wear of the generator and tends to flood the engine to a point where the unburned exhaust fumes are not adequately "scrubbed" from the system by the conventional filtering devices. Therefore it is another object of the present invention to effectively open-circuit the series winding during the instantaneous start of a generator-engine system thereby providing a greater torque for turning the engine.

According to the present invention, a mine vehicle propelled by a plurality of electrical traction motors, is provided with a storage battery for energizing the motors in accordance with demands of an operator. A diesel-powered generator having shunt and series windings serves to continuously charge the battery as the electrical energy stored in the battery is used and in some instances the generator output alone may effectively energize the traction motors.

For starting purposes, the generator functions as a motor and a switching mechanism is provided and arranged to connect the battery to the shunt winding and armature of the generator while effectively open-circuiting the series winding during starting cycle of the engine. In this arrangement, rotation is imparted to the armature and consequently to the engine crankshaft to a sufficient degree to cause starting of the engine. Immediately after starting, the series winding is positioned in closed circuit with the shunt winding and the armature, and the rotation of the latter, now under power exerted by the engine, will commence to generate current for the various functions that may be desired. A novel relay circuit is also provided and is responsive to a predetermined current in the series winding for switching a variable resistor in the shunt winding circuit thereby controlling the excitation thereof. In this manner when an excessive amount of load is placed upon the generator, the relay will be actuated to reduce the total wattage output of the generator and at the same time enable a greater amount of current to be drawn from the battery to replace that lost by the drop in generator output. This induced drop in wattage output of the generator will lower the demand upon the engine and the possibility of excessive exhaust fumes and smoke issuing from the engine because of the demand upon the generator will have been eliminated.

Another object of the present invention is to increase the starting torque of the generator by effectively open-circuiting the series winding for permitting full energization of the winding.

Other objects and advantages of the invention will become apparent upon reading the following detailed description of the invention in conjunction with the accompanying drawings wherein.

Figure 1:
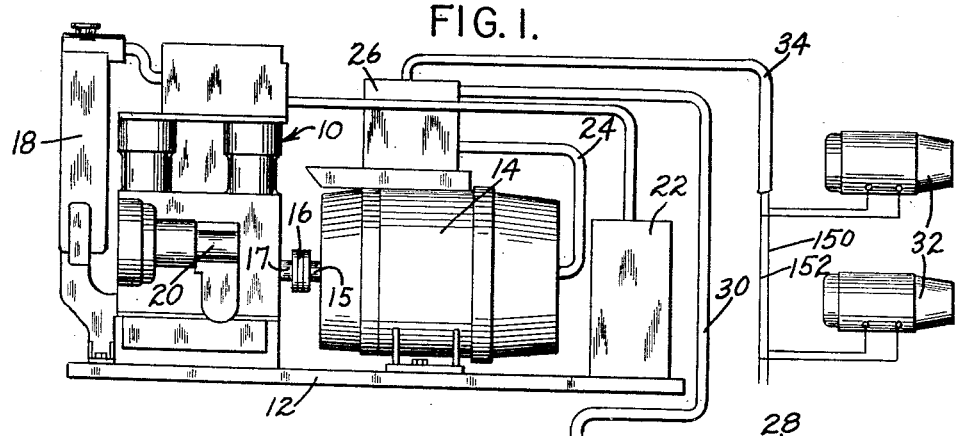
Fig. 1 is a schematic illustration of the mechanical and electrical components of the present invention in their structural relationship.

Referring to the drawings and more particularly to Fig. 1, there is shown a diesel engine or other internal combustion engine 10 suitably mounted upon a base frame 12 and being mechanically coupled to a generator 14 by means of a coupling shaft 16 connected between the crankshaft 17 of the engine 10 and the armature shaft 15 of the generator. The engine 10 includes a radiator 18, a governor 20 and a "scrubber" or filtering system 22 connected to the exhaust pipe of the engine 10.

The generator 14 is electrically connected by a cable 24 to a control box 26 which houses the essential relays and circuits for controlling the charging of a battery 28 and the output of the generator 14 as will appear more fully hereinafter. A suitable cable 30 connects the electrical elements in the control box 26 to a battery 28 for charging the same. A plurality of electrical traction motors 32 are connected to the control box 26 by a cable 34 and it will become apparent that the base frame 12 may be suitably mounted in a mine vehicle (not shown) to be propelled by the motors 32 as is well known in the art.

For a fuller description of a typical mine vehicle reference is directed to the U. S. Patent No. 2,698,104, issued December 28, 1954, to Victor I. Dudley, which shows a shuttle car for conveying mineral about a mine floor. It will also be apparent other motors may be added in parallel circuit and connected to the cable 34 for operating other equipment on a vehicle such as conveyors, pumps, lamps, mineral gathering devices and blowers. Other uses for the foregoing apparatus may become readily apparent, as for example, the apparatus may be utilized as a stationary electrical power source for mining equipment for the various purposes mentioned above.

Figure 2:
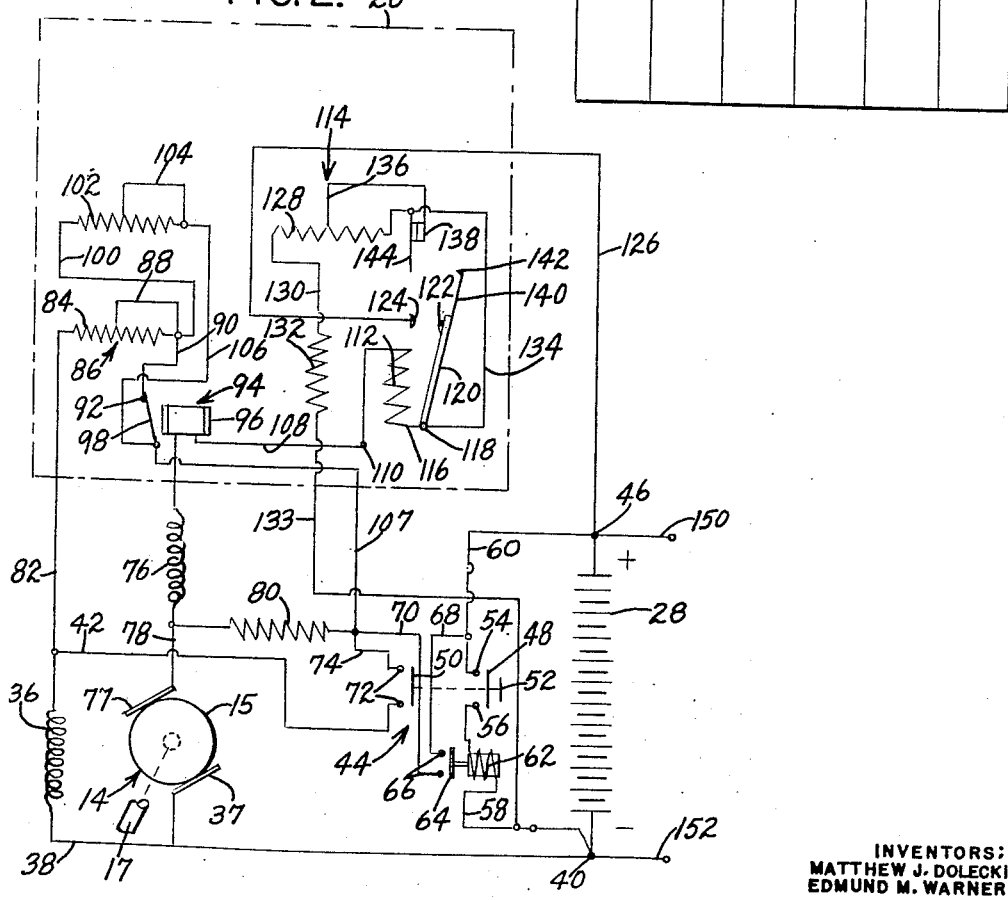
Fig. 2 is a diagrammatic illustration of the control elements of the present invention.

As shown in Fig. 2, which is a diagrammatic illustration of the various control circuits of the present invention, the generator 14 includes a shunt field winding 36 connected at one end by a conductor 38 to an armature brush 37 of the generator 14 and to the negative terminal 40 of the battery 28. The other side of the winding 36 is connected by a conductor 42 to a switching mechanism generally indicated by the reference numeral 44 and which serves to connect the winding 36 to the positive terminal 46 of the battery 28.

The switching mechanism 44 includes a pair of bridge bars 48, 50 and a push button knob 52 mechanically coupled to the bars 48, 50 for simultaneously actuating the same against their respective contacts. The bar 48 is adapted to bridge across a pair of contacts 54, 56 connected by conductors 58, 60 to the negative and positive terminals 40, 46 respectively of the battery 28. Connected in the conductor 58 and interposed between the contact 56 and the negative terminal 40 is a solenoid 62 which when energized is adapted to actuate a bridge bar 64 across a pair of contacts 66 to establish electrical communication between a pair of conductors 68, 70. When de-energized, the bar 64 will assume a retracted position away from the contacts 66 as shown in Fig. 2. The bar 50 serves to bridge across a pair of contacts 72 for connecting the conductor 42 to the conductor 70. In operation, the push button 52 is manually actuated to close the contacts 54, 56 and 72 thereby energizing the solenoid 62 through a circuit traced as follows: negative terminal 40, conductor 58, solenoid 62, contact 56, bar 48, contact 54, conductor 60 and the positive terminal 46.

Energization of the solenoid 62 serves to connect the positive terminal 46 of the battery 28 to the conductor 70 which is connected by a conductor 74 to one of the contacts 72. Upon closing of the contacts 72, the shunt winding 36 is connected across the battery 28 through a circuit traced as follows: negative terminal 40, conductor 38, winding 36, conductor 42, contacts 72, conductors 74, 70, contacts 66, conductors 68, 60 and the positive terminal 46. In effect, the switching mechanism 44 is a starting switch for energizing the shunt winding 36 of the generator 14 from the battery 28 for imparting rotation to the armature 15 thereby turning the crankshaft 17 of the engine 10 as will be readily apparent. Sufficient cranking on the part of the armature will permit the engine 10 to fire on its own and the starter button may be released to open the circuit through the contacts 72 to the field winding 36. As will be described more fully hereinafter, the field winding 36 will remain energized through another circuit.

The generator 14 is further excited by a series winding 76 connected at one end to another brush 77 of the armature 15 through a conductor 78, and a starting resistor 80 of sufficiently high ohmic value is provided between the connection of the brush 77 and the series winding 76 and the starting contacts 66 to prevent excessive current load upon the armature during starting of the engine 10.

As shown in Fig. 2, the previously traced circuits are interrelated and are connected for various controlling purposes in the control box 26, shown in dotted lines. One end of the field winding 36 is connected by a conductor 82 to one side of a variable resistor 84 of a voltage regulator mechanism generally indicated by the reference numeral 86. A manually movable contact arm 88 is adapted to slide along the length of the resistor 84 for varying the effective resistance through the regulator element 86, and consequently to vary the excitation of the shunt winding 36 thereby controlling the output of the generator 14.

The arm 88 is connected by a conductor 90 to a stationary contact 92 of a solenoid relay generally indicated by the reference numeral 94. The relay 94 is provided with a solenoid 96 which is adapted, when energized, to attract a movable contact 98, normally biased against the stationary contact 92, away from the latter for a reason to appear more fully hereafter. A conductor 100 connects the movable conductor arm 88 of the regulator 86 to one end of a second variable resistor 102 having a manually adjustable contact arm 104 adapted to slide between both extremities thereof and in electrical contact therewith. To complete the circuit to the relay 94, the contact arm 104 is connected by a conductor 106 to the movable contact arm 98, and a conductor 107 connects the arm 98 to the end of the resistor 80 remote from its connection to the winding 76.

As shown in Fig. 2, the other end of the series winding 76 remote from its connection with the armature brush 77 is connected to one side of the solenoid 96 while the other end thereof is connected by a conductor 108 to a terminal 110 of an amperage coil 112 of a reverse current relay generally indicated by the reference numeral 114. Another terminal 116 of the coil 112 has suitably hinged thereto at 118 a switch arm 120 carrying a contact 122 at the end thereof remote from the hinge 118. The contact 122 is adapted to engage a stationary contact 124 connected to the positive terminal 46 of the battery 28 by a conductor 126.

The reverse current relay 114 is arranged in a manner which will be apparent to those skilled in the art so as to include a variable resistor 128 having one end connected by a conductor 130 to a voltage coil 132 which is connected to the negative terminal 40 of the battery 28 by way of a conductor 133, and the other end connected by a conductor 134 to the terminal 116 of the coil 112. A contact arm 136 is connected through a normally closed switch 138 to the conductor 134 for varying the voltage through the coil 132 in a manner well known in the art. An arm 140 constructed from any suitable insulating material and connected to and extending outwardly of the contact arm 120 is provided with a button 142 for engagement with an abutment 144 extending from one of the contacts of the switch 138. It will be apparent that with the switch 138 in a closed position, the flow of current through the resistor 128 will be restricted to that portion to the left of the arm 136 as shown in Fig. 2. Rotation of the arm 120 in a counterclockwise direction as viewed in Fig. 2, so as to close the contacts 122, 124, also serves to position the button 142 against the abutment 144 for opening the switch 138 thereby placing the full length of the resistor 128 in circuit between the coil 132 and the coil 112.

The reverse current relay 114 may be of any suitable design currently in use and it will be understood that the values of the components 112, 128 and 132 are suitably chosen to fit the needs of the battery 28 and the output of the generator 14 as is well known in the art. It should be mentioned here that the flux generated in the coils 112 and 132, when the generator 14 is generating a voltage higher than the actual voltage of the battery 28, is such as to attract the contact arm 120 for moving the contact 122 into engagement with the contact 124 and opening the switch 138. Opening of the switch 138 will introduce the full resistance of the resistor 128 into the circuit of the coil 132 thereby decreasing the flux therein to a point near the "drop out" flux for the release of the arm 120. In the event the voltage generated drops below the voltage of the battery 28, wherein there would normally be a tendency for the current in the battery 28 to permit flow in the current in the reverse direction, the flux in the coil 112 reverses and will cancel out the now decreased flux of coil 132 to cause clockwise rotation of the arm 120 for opening the circuit from the battery 28 to the generator 14. The foregoing description of the relay 114 will be apparent to those skilled in the art and construction thereof forms no part of the present invention.

Also connected to the terminals 40, 46 of the battery 28 are conductors 150, 152 which are suitably connected to the motors 32 for driving a mine vehicle (not shown) or for conveying energy to other motors for any other purpose.

*Operation*

With the arrangement of the various switches as illustrated in Fig. 2, and the engine 10 in its non-operating condition, the apparatus is disposed for initial operation. The starter push button 52 is depressed and held in this position momentarily until the engine 10 is operating. When the button 52 is depressed, the bar 48 will bridge across the contacts 54, 56 to place the solenoid 62 across the terminals 40, 46 of the battery. Energization of the solenoid will extend the bridge bar 64 into engagement with the contacts 66 to establish electrical communication between the armature brushes 37, 77 and the terminals of the battery 28 through a circuit traced as follows: positive terminal 46, conductors 60, 68, contacts 66, conductor 70, starting resistor 80, conductor 78, brush 77, armature 15, brush 37, conductor 38 and negative terminal 40.

Simultaneously with the movement of the push button 52, the bridge bar 50 will engage the contacts 72 for energizing the shunt winding 36 through a circuit traced as follows: positive terminal 46, conductors 60, 68, contacts 66, conductors 70, 74, contacts 72, conductor 42, shunt winding 36, conductor 38 and negative terminal 40. It will be noted here that the introduction of the conductor 42 between the positive terminal 46 and the shunt winding 36 effectively open-circuits series winding 76 during the starting energization of the shunt winding 36. Normally, the series winding 76 is connected between the terminals 40, 46 through the relay mechanism 114, and the shunt winding 36 is connected across the battery 28 through the regulator 86, resistor 80 and series winding 76, as will presently appear. However, the conductor 42 affords a means for short-circuiting the regulator 86, winding 76 and the relay 114 so that the shunt winding 36 receives the full nominal voltage of the battery instantaneously with the bridging of the contacts 72, whereas the series winding receives negligible amperage at this time. Such being the case, with only the winding 36 being fully energized, near maximum torque will be experienced by the armature for delivering maximum torque to the crankshaft of the engine 10. Since, with this arrangement, the crankshaft is turned at maximum speed, a quicker start of the engine 10 results, thus reducing the wear and tear of the generator parts. In summary, the function of the switch 50, 72 and the conductor 42 permits a turning of the armature 15 with maximum torque so as to provide maximum turning effort on the crankshaft 17 and thereby overcome the turning resistance offered by an engine crankshaft.

After the starting of the engine 10, the push button 52 may be released and the winding 36 will permit the generator 14 to generate a voltage equal to or greater than the nominal voltage of the battery 28 through the circuit traced as follows: brush 77, conductor 78, winding 76, solenoid 96, conductor 108, coil 112, conductor 134, switch 138, contact arm 136, left portion of the resistor 128, conductor 130, coil 132, conductor 133 and negative terminal 40.

Upon reaching or exceeding the nominal voltage of the battery 28, the flux generated in the coils 112 and 132 will be great enough to "pull in" the arm 120 for closing of the contacts 122, 124 and the opening of the switch 138. Closing of the contacts 122, 124 will connect the series winding 76 directly across the battery 28 through a circuit traced as follows: negative terminal 40, conductor 38, brush 37, armature 15, brush 77, conductor 78, winding 76, solenoid 96, conductor 108, coil 112, arm 120, conductor 126 and the positive terminal 46. The generator 14 is now in condition for generating at its full rated output, and in the event the battery 28 is low in charge, and no load is imposed on the motors 32, the generator will charge the battery 28. A demand of current caused by the use of the motors 32 will first be supplied by the generator 14 up to its rated current output and any deficiency, if the demand is greater than the rated output, will be supplied by the battery 28.

As previously indicated, the shunt winding 36 is connected in parallel with the armature 15 and through a circuit traced as follows: brush 37, conductor 38, winding 36, conductor 82, left portion of the resistor 84, contact arm 88, conductor 90, contact arm 98, conductor 107, the resistor 80 and the brush 77. The voltage output of the generator 14 may be regulated by the positioning of the contact arm 88 upon the resistor 84 for connecting any desired amount of resistance in the shunt winding circuit. In this manner, the voltage output of the generator 14 is controlled by the variable resistor 86. However, it will be understood that such regulators are pre-adjusted for a desired voltage and are only manipulated in the event that the various circuit constants, through aging and use, have changed sufficiently to cause deviation of the desired voltage.

It will be noted that the solenoid 96 of the relay 94 is in series with the series winding 76 and the armature 15 and the resistor 102 is bypassed or short-circuited by the conductor 90 connected between the contact arm 88 and the series winding 76. With this arrangement, the current through the winding 76 is, in effect, sensed by the solenoid. The solenoid 96 is pre-set to attract the contact arm 98 away from the stationary contact 92 at some point near the maximum generated current through the winding 76. Disengagement of the contact arm 98 from the contact 92 will connect the resistor 102 in series with the regulator 86 and the shunt winding 36 resulting in a sudden stepdown of the voltage supplied by the generator 14. The relationship of this stepdown voltage with the generator output and the speed of the engine will now be discussed in conjunction with the curves illustrated in Fig. 3.

Figure 3:
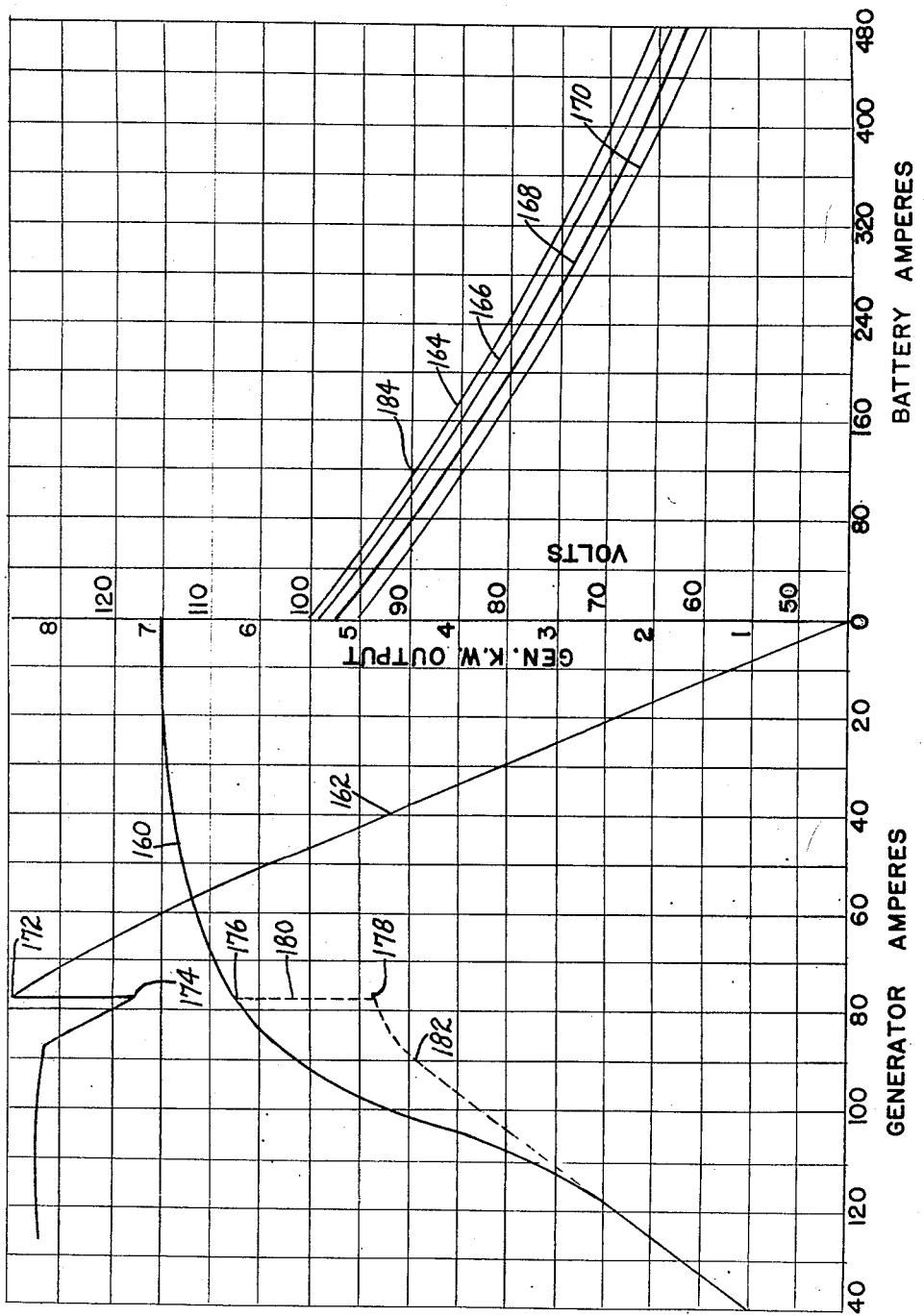
Fig. 3 is a graphical representation of some of the various electrical relationships occurring during operation of the present invention.

In Fig. 3, the nominal volt-ampere generator output curve is illustrated by the numeral 160, the generator kilowatt output versus load curve is illustrated by the numeral 162 and the numerals 164, 166, 168 and 170 indicate various charge levels of the battery 28, such as, full charge, 80% charge, 60% charge and 40% charge, respectively. In order to obtain ordinates and abscissae for the illustrated curves, an ammeter was connected between the solenoid 96 and the coil 112 and a voltmeter connected across the negative terminal 40 and the terminal 116 of the coil 112. In addition, the following values were used for the several electrical components shown in Fig. 2:

Generator 14 _____ Full load rating 7.5, 1cw continuous, fan cooled 72 amps. at 106 volts at 1800 R. P. M.
Battery 28 _____ 48 cells, 96 volts, 192 amp-hours.
Resistor 80_____ .2355 ohm.
Resistor 84_____ Variable. 0–25 ohms, 100 watts, contact arm 88 set at approximately 12.5 ohms.
Resistor 102_____ Variable. 0–25 ohms, 100 watts, contact arm 104 set at approximately 12.5 ohms.

During the normal operation of the apparatus, the engine 10 is operated at full open throttle at all times and a load, such as the motors 32, will receive its energy primarily from the generator 14. In the event the load exceeds generator capacity, the battery 28 will supply all the load demand in excess of generator rating. In this event the cumulative amperage output of the battery 28 and the generator 14 are available for maximum effect. During periods with no external load such as the motors 32, the generator 14, due to the full throttle operation of the engine 10, will charge the battery to bring the same back to its original rating. Should the battery be fully charged during these periods of no external load, the battery would receive what is commonly referred to as an "equalizing charge." It may be pointed out here that the maximum generator no-load voltage is set by the proper adjustment of the resistor 84 and the maximum engine R. P. M. set by the governor 20. It will be apparent that the maximum no-load voltage is established lower than the voltage at which the battery would "gas."

In order to determine the individual currents delivered by the generator 14 and the battery 28, at full charge, for a particular load, the current demand to satisfy the load is first noted and the curves 160 and 164 are traced until a current indicative point on the curve 160 for the generator is found to lie in a horizontal plane with a current indicative point on the curve 164 for the battery. The current values at these points should equal the load demand. As an example, assume that a demand of 210 amperes is required. It will be noted that a point 182 on the curve 180 lies in a horizontal plane with a point 184 on the curve 164 and that the sum of the currents, namely 90 amperes for the generator and 120 amperes for the battery, will equal 210 amperes, or the demand. It will be understood that in the event the battery 28 is not at full charge, the curves 166, 168 and 170 may be utilized instead of the curve 164. It will also be understood that for any load demand less than 78 amperes, the generator will assume the full load since there is no corresponding point on any of the battery curves.

Referring now to the curve 160 in Fig. 3, it will be noted that as the value of amperes output of the generator increases the voltage decreases. This also holds true for the curves 164–170 with respect to the battery potential. In similar fashion, the curve 162 represents the generator kilowatt output necessary in order to obtain certain values of current for any particular load. In other words, as the load demand by the motors 32 increases, that is, demand of current, the output of the generator in kilowatts must increase in order to meet the demand.

As previously indicated, the engine 10 is provided with a governor 20 for limiting the R. P. M. output of the engine, and as is customary with engine-generator charging systems wherein relatively constant potential is desired, the generator is capable of continuing the generation of current beyond its rating and the governed R. P. M. output of the engine in order to prevent overtaxing of the generator. However, rapidly changing loads in excess of the generator rating will tend to decrease the speed of the engine 10, and the action of the governor will be to compensate for this increased demand and in so doing excessive fuel will be injected into the combustion chambers of the engine 10, thereby causing smoking and excessive exhaust fumes which will not be adequately filtered in the scrubber 22. In addition, loss of R. P. M. will be experienced by the engine 10 due to improper fuel-air mixtures in the fuel distribution means of the engine. In order to avoid these conditions, the solenoid 96 is preadjusted to actuate the contact arm 98 away from the contact 92 when the generator 14 is generating current at a value slightly below the value which would overtax the engine as indicated above. In Fig. 3, this point is indicated at 172, and the current output of the generator 14 at this point is approximately 78 amperes. When this point is reached, that is, when the generator output reaches 78 amperes, contact arm 98 is disengaged from the contact 92 and the left portion of the resistor 102 is placed in series with the shunt winding 36. The addition of this resistance in the shunt winding current will reduce the voltage output of the generator 14 in a step fashion and consequently will lower the kilowatt output of the generator as shown at point 174 on the curve 162. The step effect of the increase of the resistance on the voltage output of the generator 14 is shown between points 176, 178 on the curve 180 which indicates the actual volt-ampere output of the generator 14 with the utilization of the solenoid 96 and the resistance 102. Normally, engine-generating-charging systems of this character would operate along the curve 160, however, with the introduction of the resistance 102, at the point when smoking of the engine 10 occurs, the curve 160 will follow a path traced as follows: starting from the Y–axis of the voltage, and proceeding to the left as viewed in Fig. 3, point 176, downwardly to point 178, then downwardly as shown from point 178 to a point where the actual curve 180 merges with the nominal volt-amperes curve 160 actual volt-ampere curve 180 corresponds with the points 172, 174, respectively, on the curve 162.

As known in the art, the speed of the engine in an engine-generating-charging system, is proportional to the voltage output of the generator and since the kilowatt output can only reach a certain value, any load which is in excess of full load, measured in amperes, will result in the decrease of the voltage output and consequently the R. P. M. output of the engine. In other words, a load demand in excess of the full load will increase the current output of the generator and decrease the voltage output since the generator output in kilowatts must stay constant. For purposes of illustration, let us assume the full kilowatt output is 8.4 kw., then $$8.4 = 1000 VA = K_1 [\text{R. P. M.} \times \text{torque}]$$

where $V$ = voltage output of the generator
$A$ = current output of the generator in amperes
$K_1$ = conversion contact
R. P. M. = revolutions per minute of the engine shaft
Torque = torque output of the engine As is generally known, the voltage output of a generator is a function of the speed of the armature and the excitation of the shunt and service windings. It is obvious a change in either or both will effect voltage output, and in the present invention, a change in the excitation of the shunt winding is developed by the control of the resistance in the shunt winding circuit.

Before the introduction of the resistance 102, and when the current output is approximately 78 amperes, as illustrated at point 176 in Fig. 3, it will be noted that the voltage output is 108 volts. After the introduction of the resistance 102, it is noted that the kilowatt output is 7.25 with the voltage at 93 volts and the current remaining at 78 amperes. From this, it will be apparent that the R. P. M. output of the engine will increase, however, the load upon the engine decreases because of the lower demand thereon.

From the foregoing it will be apparent that as the generator current output reaches a value approaching a condition which will cause smoking of the engine 10, the generator voltage output will be sharply reduced in order to lessen the demand upon the engine 10 and consequently, the requirement for the torque output of the engine will be reduced below the point where smoking occurs. It will be noted that this drop in voltage of the generator 14 and the drop in torque of the engine 10 will not appreciably affect the current output of the generator, and, therefore, the generator 14 remains in condition to supply at least approximately 78 amperes to the motors 32.

As previously stated, the cumulative current ratings of both the generator 14 and the battery 28 are disposed for supplying energy to the motors 32. In the event that a demand calls for 20 amperes, the generator 14 will supply the necessary current, however, if the demand exceeds 78 amperes, say at 200 amperes, in attempting to satisfy this demand, the operating characteristics of the generator 14 will follow the curve 160 as the same extends to the left as viewed in Fig. 3. At approximately 78 amperes, the solenoid 96 will be energized to attract the arm 98 from the contact 92 and cause the introduction of the left portion of the resistor 102 into the shunt winding circuit. This will lower the generator output voltage from point 176 to 178 on the curve 180 and permits the introduction of battery current for assisting the generator and completely satisfying the demand at a faster rate than would be experienced if the generator 14 was allowed to follow its normal characteristic as indicated by the curve 160 and without overtaxing the engine 10 to a point wherein smoking of the same will occur. Starting from the point 178 and proceeding to the left, the point 182 is reached wherein the current output of the generator 14 plus the current delivered by the battery 28 will equal the demand of 210 amperes. In this instance, the generator output is 90 amperes and the current delivered by the battery is 120, assuming full charge thereof. In the event the battery 28 is at 80% charge, the current supplied thereby would only be approximately 110 amperes and a new pair of points would have to be found on the curves 180 and 166 and which will total 210 amperes.

While there is in this application specifically described one form which the invention may assume in practice, it will be understood that this form of the same is shown for purposes of illustration and that the invention may be modified and embodied in various other forms without departing from its spirit or the scope of the appended claims.

What we claim as new and desire to secure by Letters Patent is:

1. In a device of the character described for energizing an electrical load, an engine, a generator having an armature coupled to said engine to be driven thereby and having series and shunt windings electrically connected to said armature, a storage battery electrically connected to said generator to be charged thereby during operation of said engine for energizing the load in accordance with the demands thereof, said battery being adapted to energize said shunt winding for rotating said armature to effect start of said engine, means connected in circuit with said shunt winding for regulating the output of said generator, means responsive to a predetermined output characteristic of said generator for limiting the excitation of said shunt winding, and means for short-circuiting said regulating means and said responsive means during the starting period of said engine for permitting full energization of said shunt winding.

2. In a device of the character described for energizing an electrical load, an engine having a governor for maintaining a steady R. P. M. output, a generator having an armature coupled to said engine to be driven thereby and having series and shunt windings electrically connected to said armature, a storage battery electrically connected to said generator to be charged thereby during operation of said engine for energizing the load in accordance with the demands thereof, said generator being adapted to generate an electrical characteristic in accordance with the torque delivered by said engine, means responsive to a predetermined value of said electrical characteristic of said generator for maintaining said value at a reduced value of torque delivered by said engine, a circuit connecting said battery to said shunt winding to effect excitation of the latter for rotating said armature during starting period of said engine, means connected in circuit with said shunt winding for regulating the output of said generator, and means for short-circuiting said regulating means during the starting period of said engine for permitting full energization of said shunt winding.

3. In a device of the character described for energizing an electrical load, an engine, a generator having an armature coupled to said engine to be driven thereby and having series and shunt windings electrically connected to each armature, a storage battery electrically connected to said generator to be charged thereby during operation of said engine for energizing the load in accordance with the demands thereof, switching mechanism for connecting said battery to said shunt winding for rotating said armature to effect starting of said engine, said mechanism including means to effectively open-circuit the connection between said series-winding and said armature during said starting of said engine, and means connected in circuit with said shunt winding for regulating the output of said generator.

4. In a device of the character described for energizing an electrical load, an engine having a governor for maintaining a steady R. P. M. output, a generator having an armature coupled to said engine to be driven thereby and having series and shunt windings electrically connected to said armature, a storage battery electrically connected to said generator to be charged thereby during operation of said engine for energizing the load in accordance with the demands thereof, said generator being adapted to generate an electrical characteristic in accordance with the torque delivered by said engine, and means responsive to a predetermined value of said electrical characteristic of said generator for maintaining said value at a reduced value of torque delivered by said engine.

5. In a device of the character described for energizing an electrical load, an engine having a governor for maintaining a steady R. P. M. output, a generator having an armature coupled to said engine to be driven thereby and having series and shunt windings electrically connected to said armature, a storage battery electrically connected to said generator to be charged thereby during operation of said engine for energizing the load, said generator being adapted to generate a current in accordance with the torque delivered by said engine, an impedance element, means responsive to a predetermined value of the generated current for connecting said impedance element to said shunt winding for maintaining said predetermined value of the current at a reduced torque delivered by said engine.

6. In a device of the character described for energizing an electrical load, an engine having a governor for maintaining a steady R. P. M. output, a generator having an armature coupled to said engine to be driven thereby and having series and shunt windings electrically connected to said armature, a storage battery electrically connected to said generator to be charged thereby during operation of said engine for energizing the load, said generator being adapted to generate a current in accordance with the torque delivered by said engine, an impedance element, a relay connected to said series winding being responsive to a predetermined value of the generated current for connecting said impedance element to said shunt winding for maintaining said predetermined value of the current at a reduced torque delivered by said engine.

References Cited in the file of this patent

UNITED STATES PATENTS

| | | |
|---|---|---|
| 1,236,221 | Smith et al. | Aug. 7, 1917 |
| 1,790,634 | Arendt | Jan. 17, 1931 |
| 2,434,413 | Justus | Jan. 13, 1948 |
| 2,666,872 | Austin et al. | Jan. 19, 1954 |
| 2,698,104 | Dudley | Dec. 28, 1954 |
| 2,761,978 | Piumi | Sept. 4, 1956 |